(12) United States Patent
Larcher et al.

(10) Patent No.: US 11,094,145 B2
(45) Date of Patent: Aug. 17, 2021

(54) DEVICE AND METHOD FOR DETECTING A DRIVING EVENT OF A VEHICLE

(71) Applicant: Robert Bosch GmbH, Stuttgart (DE)

(72) Inventors: Nils Larcher, Tuebingen (DE); Henar Martin Rodriguez, Stuttgart (DE); Peter Bakucz, Klosterlechfeld (DE)

(73) Assignee: Robert Bosch GmbH, Stuttgart (DE)

( * ) Notice: Subject to any disclaimer, the term of this patent is extended or adjusted under 35 U.S.C. 154(b) by 258 days.

(21) Appl. No.: 16/343,883

(22) PCT Filed: Oct. 16, 2017

(86) PCT No.: PCT/EP2017/076308
§ 371 (c)(1),
(2) Date: Apr. 22, 2019

(87) PCT Pub. No.: WO2018/077644
PCT Pub. Date: May 3, 2018

(65) Prior Publication Data
US 2020/0058175 A1      Feb. 20, 2020

(30) Foreign Application Priority Data
Oct. 24, 2016   (DE) .......................... 102016220817.9

(51) Int. Cl.
*G07C 5/00*      (2006.01)
*G07C 5/02*      (2006.01)
*G07C 5/08*      (2006.01)

(52) U.S. Cl.
CPC ............... *G07C 5/08* (2013.01); *G07C 5/008* (2013.01); *G07C 5/02* (2013.01)

(58) Field of Classification Search
CPC ............. G07C 5/08; G07C 5/008; G07C 5/02
(Continued)

(56) References Cited

U.S. PATENT DOCUMENTS

2008/0119995 A1*   5/2008   Ubel ................... H02H 7/0851
                                                                   701/49
2012/0078814 A1    3/2012   Clark et al.
(Continued)

FOREIGN PATENT DOCUMENTS

DE        19611973 A1      10/1996
DE        19713087 A1      11/1997
(Continued)

OTHER PUBLICATIONS

International Search Report for PCT/EP2017/076308, dated Feb. 15, 2018.

*Primary Examiner* — Gertrude Arthur Jeanglaude
(74) *Attorney, Agent, or Firm* — Norton Rose Fulbright US LLP; Gerard Messina

(57) ABSTRACT

A device for detecting a driving event of a vehicle, having a triaxial acceleration sensor and a processing unit. The device may be fixedly installed on the vehicle. The processing unit is configured to detect a plurality of acceleration values within a specific time span using the acceleration sensor, carry out a wavelet transform of the acceleration values to determine first coefficients, and compare the first coefficients at least to stored second coefficients. The second coefficients represent a predefined driving event. The processing unit is configured to detect the driving event represented by the second coefficients as an occurred driving event when the first coefficients are in agreement with the second coefficients, and is configured to determine characteristic parameters of the detected acceleration values, to ascertain a specific mother wavelet as a function of the characteristic parameters, and to carry out the wavelet transform based on the ascertained mother wavelet.

12 Claims, 2 Drawing Sheets

(58) Field of Classification Search
USPC .......................................................... 701/31.4
See application file for complete search history.

(56) References Cited

U.S. PATENT DOCUMENTS

2015/0246654 A1  9/2015  Tadic et al.
2018/0170393 A1* 6/2018  Decker .................. G07C 5/008

FOREIGN PATENT DOCUMENTS

| DE | 10042376 C1 | 10/2001 |
| DE | 202004009922 U1 | 11/2005 |
| JP | 2002065640 A | 3/2002 |
| JP | 2010256943 A | 11/2010 |
| WO | 2015121639 A1 | 8/2015 |

* cited by examiner

DEVICE AND METHOD FOR DETECTING A DRIVING EVENT OF A VEHICLE

BACKGROUND INFORMATION

The present invention is based on a device for detecting a driving event of a vehicle, the device having a triaxial acceleration sensor and a processing unit. The device may be fixedly installed on the vehicle. In addition, a processing unit is configured to detect a plurality of acceleration values within a certain time span using the acceleration sensor, to carry out a wavelet transformation of the acceleration values in order to determine first coefficients, and to compare the first coefficients at least to stored, second coefficients. The second coefficients represent a predefined driving event. In addition, the processing unit is configured to detect the driving event represented by the second coefficient as an occurred driving event when the first coefficients are in agreement with the second coefficients.

Such a device is described in PCT Application No. WO 2015/121639 A1, for instance. In this application, acceleration values are detected within a predefined time span, first coefficients are subsequently determined based on a wavelet transformation of the acceleration values, and they are then compared to second coefficients. If the first and second coefficients are in agreement, then it will be inferred that the driving event represented by the second coefficients has occurred within the specific time span.

In addition, the present invention relates to a method for detecting a driving event of a vehicle.

SUMMARY

The present invention is based on a device for detecting a driving event of a vehicle, the device having a triaxial acceleration sensor and a processing unit. The device may be fixedly installed on the vehicle. Moreover, the processing unit is configured to detect a plurality of acceleration values within a specific time span with the aid of the acceleration sensor, to carry out a wavelet transform of the acceleration values in order to determine first coefficients, and to compare the first coefficients at least to stored second coefficients. The second coefficients represent a predefined driving event. In addition, the processing unit is configured to detect the driving event represented by the second coefficients as an occurred driving event when the first coefficients are in agreement with the second coefficients. In accordance with the present invention, the processing unit is configured to determine characteristic parameters of the detected acceleration values, to ascertain a specific mother wavelet as a function of the characteristic parameters, and to carry out the wavelet transform based on the ascertained mother wavelet. This offers the advantage that the determination of characteristic parameters of the acceleration values and, as a consequence, the ascertainment of a specific mother wavelet, leads to an increase in the reliability of the detection of a driving event. Moreover, the detection of a driving event is independent of the specific type of vehicle and also independent of the location in which the device is installed in or on the vehicle.

According to one advantageous further development of the present invention, the processing unit is configured to compare the first coefficients at least to second coefficients which are stored in a table. This has the advantage of constituting an uncomplicated possibility for comparing the first coefficients to the second coefficients. Moreover, it is also possible to store further coefficients in such a table in order to check different driving events.

According to one further advantageous development of the present invention, the device has a communications unit, in particular a wireless communications unit, and the processing unit is configured to transmit the detected driving event with the aid of the communications unit. This has the advantage that an external unit is able to detect the information concerning the detected driving event and may respond to it appropriately.

According to one advantageous embodiment of the present invention, the characteristic parameters are statistical moments. This is advantageous insofar as the determination of statistical moments of the acceleration signal represents a particularly simple possibility for determining the characteristic parameters required to ascertain the mother wavelet. The determination is therefore able to be implemented in a rapid manner.

According to one further advantageous embodiment of the present invention, the characteristic parameters are non-linear parameters. This has the advantage that it allows for a particularly exact determination of the mother wavelet, thereby also making the result of the driving-event determination more reliable.

According to one advantageous embodiment, the non-linear parameters are fractal dimensions or Lyapunov exponents. This is advantageous insofar as it presents a simple possibility for determining the non-linear parameters. Such a determination may reduce the computational work, in particular.

In addition, the present invention relates to a method for detecting an occurred driving event of a vehicle having a device including a triaxial acceleration sensor, the device being fixedly installable on the vehicle and the method including the following method steps:

a. Detecting a plurality of acceleration values of the acceleration sensor within a specific time span, b. Determining characteristic parameters of the detected acceleration values, c. Ascertaining a specific mother wavelet as a function of the characteristic parameters, d. Carrying out a wavelet transform of the acceleration values based on the ascertained mother wavelet in order to determine first coefficients, e. Comparing the first coefficients at least to stored second coefficients, the second coefficients representing a predefined driving event, f. Detecting the driving event, which is represented by the second coefficients, as an occurred driving event when the first coefficients are in agreement with the second coefficients.

This has the advantage that the determination of characteristic parameters of the acceleration values and, as a consequence, the ascertainment of a specific mother wavelet, increases the reliability of the detection of a driving event. In addition, the detection of a driving event is independent of the specific type of vehicle and also independent of the location at which the device is installed in or on the vehicle.

According to one advantageous embodiment of the method according to the present invention, in method step e, the first coefficients are compared at least to second coefficients stored in a table. This is advantageous insofar as it constitutes a simple possibility for comparing the first coefficients to the second coefficients. Moreover, it is also possible to store further coefficients in such a table in order to check different driving events.

According to one advantageous embodiment of the method of the present invention, a method step g takes place after method step f, in which the detected driving event is transmitted, in particular in a wireless manner. This is advantageous insofar as an external unit is able to detect the information concerning the detected driving event and respond to it appropriately.

According to another advantageous embodiment of the method of the present invention, the characteristic parameters in method step b are statistical moments. This has the advantage that the determination of statistical moments of the acceleration signal represents a particularly uncomplicated possibility for determining the characteristic parameters required for ascertaining the mother wavelet. This allows for a rapid determination.

In one advantageous embodiment of the method according to the present invention, the characteristic parameters in method step b are non-linear parameters. This is advantageous insofar as it allows for a particularly exact determination of the mother wavelet, which also means that the result of the driving event determination becomes even more reliable.

In one further advantageous embodiment of the method of the present invention, the non-linear parameters are fractal dimensions or Lyapunov exponents. This offers the advantage of constituting a simple possibility for determining the non-linear parameters. A determination of this kind may reduce the computational work, in particular.

DETAILED DESCRIPTION OF EXAMPLE EMBODIMENTS

Figure 1:
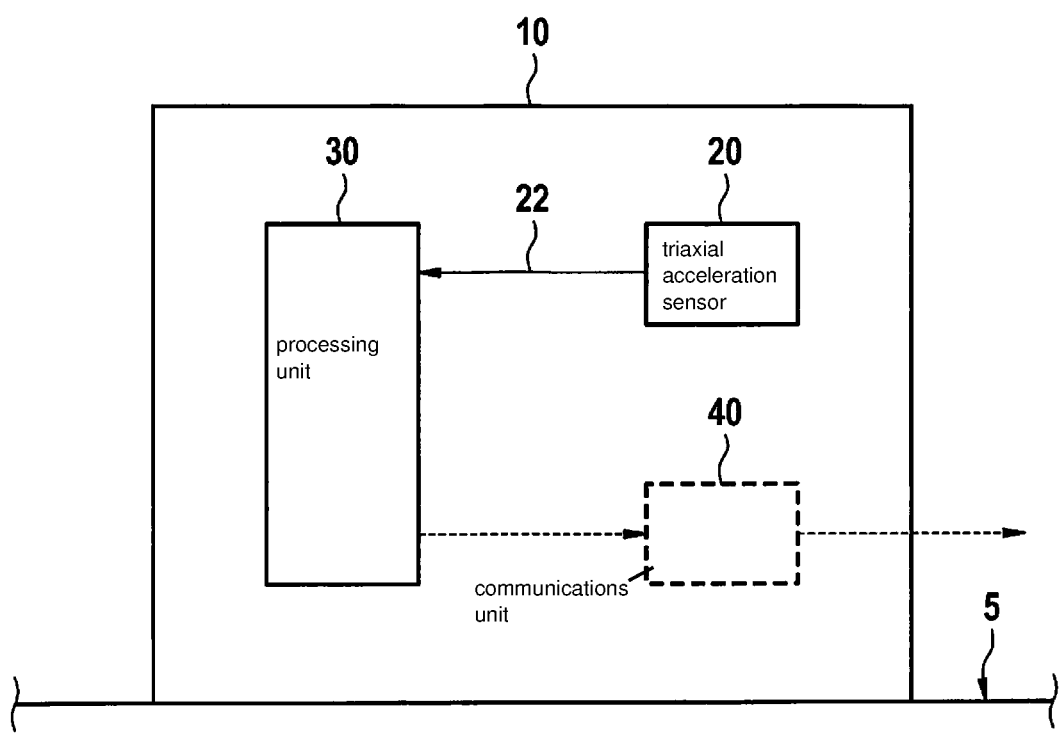
FIG. 1 shows an exemplary embodiment of a device for detecting an occurred driving event of a vehicle according to the present invention.

FIG. 1 shows an exemplary embodiment of a device for determining an occurred driving event of a vehicle according to the present invention. Shown is a device 10, which has a triaxial acceleration sensor 20 and a processing unit 30. Processing unit 30 is connected to acceleration sensor 20 in a manner that allows processing unit 20 to detect acceleration values 22 within a certain time span with the aid of acceleration sensor 20. Processing unit 20 could be a microcontroller, for example. In addition, device 10 is fixedly installed on a vehicle 5. For example, this fixed installation may be accomplished by plugging device 10 into a receptacle (not shown) of a cigarette lighter located in vehicle 5. Device 10 may also be supplied with energy via the receptacle for the cigarette lighter, for example. Processing unit 30 is set up to detect an occurred driving event of the vehicle on the basis of detected acceleration values 22. For this purpose, processing unit 30 is configured to determine characteristic parameters of detected acceleration values 22, to ascertain a specific mother wavelet as a function of the characteristic parameters, and to carry out the wavelet transform based on the ascertained mother wavelet. The wavelet transform is used for determining first coefficients. In addition, processing unit 30 is configured to compare the first coefficients at least to stored second coefficients. The second coefficients represent a predefined driving event. The second coefficients is able to be stored in a memory unit (not shown) of device 10, which is connected to processing unit 30. Alternatively, the second coefficients may also be stored in an internal memory of processing unit 30. Processing unit 30 is configured to detect the driving event represented by the second coefficients as an occurred driving event when the first coefficients are in agreement with the second coefficients.

Optionally, device 10 also includes a communications unit 40, in particular a wireless communications unit. Communications unit 40, for example, may be a WLAN or Bluetooth module. Processing unit 30 is connected to communications unit 40 so that processing unit 30 is able to transmit a detected driving event with the aid of communications unit 40.

Figure 2:
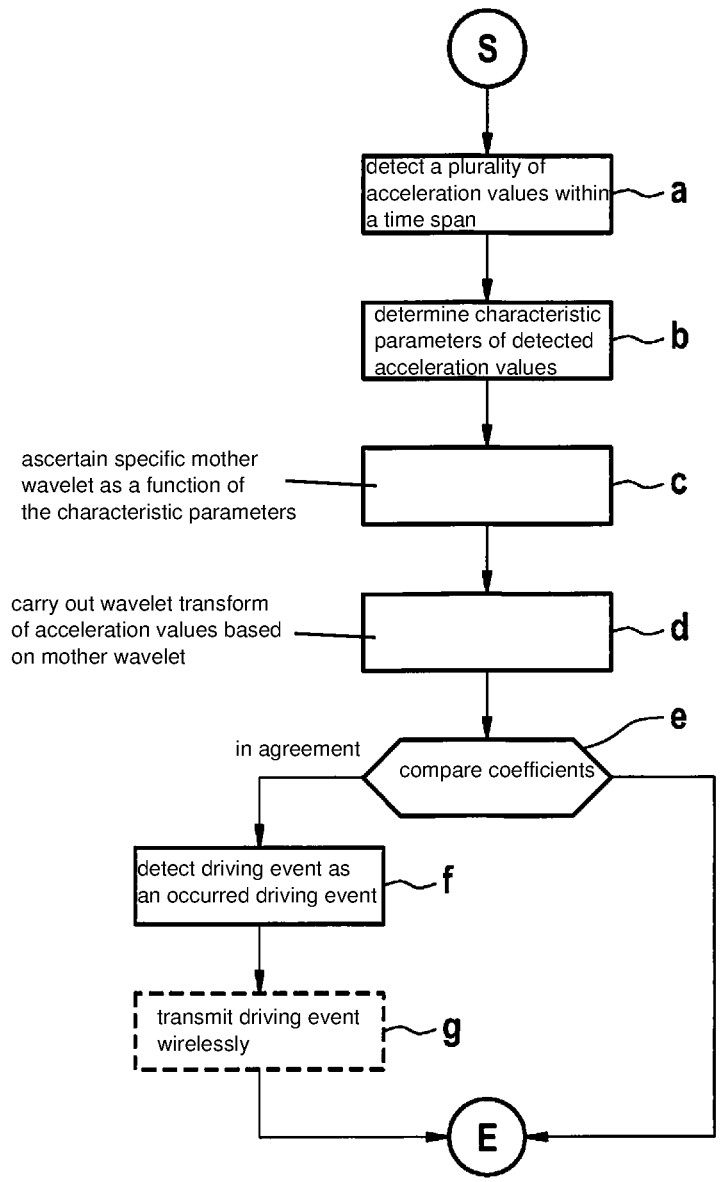
FIG. 2 shows an exemplary embodiment of a method for detecting an occurred driving event of a vehicle according to the present invention.

FIG. 2 shows an exemplary embodiment of a method for detecting an occurred driving event of a vehicle according to the present invention.

To begin with, in a method step a, a plurality of acceleration values 22 of an acceleration sensor 20 of a device 10 is detected within a certain time span using a processing unit 30 of device 10.

In a method step b, characteristic parameters of detected acceleration values 22 are then determined. Such characteristic parameters, for instance, may be statistical moments of acceleration signal 22, or in other words, the mean value or the variance of acceleration values 22, for example. Alternatively, however, the characteristic parameters may also be non-linear parameters. Such non-linear parameters, for instance, may again be determined as fractional dimensions or Lyapunov exponents. To determine such non-linear parameters, acceleration values 22 are transformed from the time-acceleration coordinate space into an x-y coordinate space. In addition, the convergence of such a transform of the coordinate spaces may optionally be checked, or it may be checked whether the transformed values are unambiguous and thus maximally one y-value is associated with each x-value. In the determination of the characteristic parameters as non-linear parameters, the time span of the detected acceleration values 22 may be clearly greater given the same effort than in a determination with the aid of stochastic moments. This is so because the computational work involved in the determination with the aid of stochastic moments increases in a linear fashion with the time period of detected acceleration values 22.

Next, in a method step c, a specific mother wavelet is ascertained as a function of the characteristic parameters. For instance, the ascertainment of the mother wavelet is carried out by utilizing the smallest order of the statistical moments that results in zero. The mother wavelet is then able to be adapted based on these statistical moments.

After the mother wavelet has been ascertained in method step c, a method step d ensues. In method step d, the wavelet transform of acceleration values 22 is carried out on the basis of the mother wavelet, and first coefficients are determined in this way. Optionally, the transformed acceleration values may also be retransformed and the resulting values be compared to original acceleration values 22. If the two values do not agree, then it may be inferred that no matching mother wavelet had been selected and that the driving-event detection will most likely not deliver a correct result. In addition, the signal-to-noise ratio is able to be improved by the wavelet transform based on the ascertained mother wavelet, so that a noise suppression is achieved.

In a subsequent method step e, the first coefficients are compared at least to second stored coefficients. The second coefficients represent a predefined driving event. If the first coefficients are in agreement with the second coefficients, then a method step f will follow. In method step f, the driving event represented by the second coefficients is detected as an occurred driving event.

On the other hand, if the first coefficients differ from the second coefficients, the method will be terminated. Optionally, the first coefficients are also able to be compared to further coefficients, which represent further driving events in each case.

Optionally, a method step g is carried out following method step f. In method step g, the driving event detected in method step f is transmitted using a communications unit 40 of device 10, the transmission being implemented in a wireless manner, in particular.

What is claimed is:

1. A device for detecting a driving event of a vehicle, the device comprising:
    a triaxial acceleration sensor; and
    a processing unit configured to detect a plurality of acceleration values within a specific time span using the acceleration sensor, the processing unit further configured to determine characteristic parameters of the detected acceleration values, to ascertain a specific mother wavelet as a function of the determined characteristic parameters, to carry out a wavelet transform of the acceleration values based on the ascertained mother wavelet to determine first coefficients, and to compare the first coefficients at least to stored second coefficients, the second coefficients representing a driving event, and to detect the driving event represented by the second coefficients as an occurred driving event when the first coefficients are in agreement with the second coefficients;
    wherein the device is configured to be fixedly installed on the vehicle.

2. The device as recited in claim 1, wherein the stored second coefficients are stored in a table.

3. The device as recited in claim 1, further comprising:
    a wireless communications unit, wherein the processing unit is configured to transmit the detected driving event using the wireless communications unit.

4. The device as recited in claim 1, wherein the characteristic parameters are statistical moments.

5. The device as recited in claim 1, wherein the characteristic parameters are non-linear parameters.

6. The device as recited in claim 5, wherein the non-linear parameters are fractal dimensions or Lyapunov exponents.

7. A method for detecting an occurred driving event of a vehicle using a device having a triaxial acceleration sensor, the device being configured to be fixedly installed on the vehicle, the method comprising:
    a. detecting a plurality of acceleration values of the acceleration sensor within a specific time span;
    b. determining characteristic parameters of the detected acceleration values;
    c. ascertaining a specific mother wavelet as a function of the characteristic parameters;
    d. carrying out a wavelet transform of the acceleration values based on the ascertained mother wavelet in order to determine first coefficients;
    e. comparing the first coefficients at least to stored second coefficients, the second coefficients representing a predefined driving event; and
    f. detecting the driving event represented by the second coefficients as an occurred driving event when the first coefficients are in agreement with the second coefficient.

8. The method as recited in claim 7, wherein in method step e, the first coefficients are compared at least to the stored second coefficients which are stored in a table.

9. The method as recited in claim 7, further comprising:
    g. after step f, wirelessly transmitting the detected driving event.

10. The method as recited in claim 7, wherein the characteristic parameters in method step b are statistical moments.

11. The method as recited in claim 7, wherein the characteristic parameters in method step b are non-linear parameters.

12. The method as recited in claim 11, wherein the non-linear parameters are fractal dimensions or Lyapunov exponents.

* * * * *